United States Patent
Chen et al.

(10) Patent No.: US 6,913,418 B2
(45) Date of Patent: Jul. 5, 2005

(54) UNDERWATER BUILDING UNIT AND METHODS OF INSTALLATION AND APPLICATION THEREOF

(75) Inventors: Zhenxin Chen, Dongying (CN); Ze Chen, c/o Zhuangxi Oil Extraction Factory Jiguan, Shengli Oil Field, Hekou District, Dongying City, Shandong Province (CN), 257237

(73) Assignee: Ze Chen, Dongying (CN)

( * ) Notice: Subject to any disclaimer, the term of this patent is extended or adjusted under 35 U.S.C. 154(b) by 0 days.

(21) Appl. No.: 10/633,311

(22) Filed: Aug. 4, 2003

(65) Prior Publication Data

US 2004/0076477 A1 Apr. 22, 2004

(30) Foreign Application Priority Data

Aug. 2, 2002 (CN) ........................................ 02135334 A (51) Int. Cl.⁷ ................................................ E02B 3/06
(52) U.S. Cl. ............................. 405/31; 405/21; 405/15; 405/195.1
(58) Field of Search ............................. 405/35, 34, 33, 405/31, 30, 22, 21, 25, 15, 195.1

(56) References Cited

U.S. PATENT DOCUMENTS 1,137,049 A * 4/1915 Callahan ..................... 405/34
3,280,569 A * 10/1966 Wosenitz ..................... 405/34
6,361,247 B1 * 3/2002 Detiveaux ..................... 405/21

* cited by examiner

Primary Examiner—Frederick L. Lagman
(74) Attorney, Agent, or Firm—Nixon & Vanderhye P.C.

(57) ABSTRACT

The present invention discloses an underwater building unit and its installation and application methods. It includes a caisson with both ends open and is composed of two rows of box boards being not intersected with each other. Each row of box boards consists of a set of stake-plate body combinations and the bind members between every two adjacent stake-plate body combinations. A positioning beam is located on the top of the box boards and connects the two box boards. There is a cross rib at the middle part of the outer surface of each bind member. The open caisson is made up of small components of low weight. So it is easy for installation and could be extended unlimitedly as required. In addition, the underwater building unit has low underwater condition requirement and is relatively stable, thus the underwater building is quite firm and has a long life. Each component of the open caisson can be industrially manufactured on land so as to lower the cost and free of the influence of stormy waves.

16 Claims, 7 Drawing Sheets

UNDERWATER BUILDING UNIT AND METHODS OF INSTALLATION AND APPLICATION THEREOF

CROSS REFERENCE TO PRIORITY APPLICATION

The present application claims the benefit of Chinese Application No. 02135334.4 filed Aug. 2, 2002, incorporated by reference in its entirety.

TECHNICAL FIELD

The present invention relates to an underwater building unit and its installation and application methods.

BACKGROUND OF THE INVENTION

At present, normally the construction of underwater permanent building, such as sea entry road and artificial island, is to fill grit into water first until the height is higher than the water level, and then to construct slope protection dam, i.e. artificial island with slope protected by sand bag, artificial island with natural slope and artificial island at the expense of beach. By this method, the amount of grit used increases in geometric order with water depth. It costs much and has short life. Another method is to fill a square-shaped assembly with grit, solidified soil in bags, or concrete which does not spread in water and then to heighten it with cast-in-place concrete with mould plate after it is higher than the water level. Because square-shaped assemblies are repeated and there is no stake foundation, it is easy to be destroyed by stormy waves. The disadvantage of this method lies in: not only the seabed foundation needs to be disposed during construction, but also the hoisting of the assembly is too frequent when the assembly is small, or is inconvenient when the assembly is too big and heavy. Accordingly, this method normally takes a long construction period and high cost while safety factor is low.

SUMMARY OF THE INVENTION

The object of this invention is to provide an underwater building unit featured by simple structure, low cost, firm, easy to install and no need of disposal for seabed etc., and its application method.

The building unit of this invention includes an assembly that is composed of two rows of box boards not being intersected with each other and with both ends open; each row of box boards includes a set of stake-plate body combinations and a set of bind members each between every two adjacent stake-plate body combinations; a positioning beam is located on the top of the box boards and connects two box boards; and a cross rib is at the middle section of the outer surface of each bind member. The assembly of this invention is made up of small components with low weight. So it is easy for installation and could be extended unlimitedly as required. In addition, because the assembly has stake, it has low underwater condition requirement and be relatively stable, and the underwater building is quite firm and has a long life. Each component of this assembly can be industrially manufactured on land so as to lower the cost and be free of the influence of stormy waves. Specifically, taking the hoisting weight and cost into consideration, there may be two forms of assembly which can be applied to shallow water and deep water construction areas, respectively.

The structure of the assembly which applies to the shallow water area is described as follows: the bind members are positioning stake-plate body combinations which are located above the cross rib of the plate body and have outwardly protruded parts, the stake-plate body combinations and the positioning stake-plate body combinations are mounted facing each other in the two rows of box boards respectively; a positioning beam mounting groove is formed in the middle of the top edge of the plate body of the positioning stake-plate body combination, at least a part of the main girder of the positioning beam is embedded into the positioning beam mounting groove; and the length of the main girder of the positioning beam should be consistent with the distance between the outer edges of the plate bodies of the two opposite positioning stake-plate body combinations of the two rows of box boards.

In the above structure, a cross rib is provided on the outer surface of the stake-plate body combination, and the cross rib is located at the position being consistent with the cross rib on the plate body of the positioning stake-plate body combination, and can couple with the outwardly protruded parts of the plate body of the positioning stake-plate body combination. The length of the cross rib should let the rib to be coupled with the protruded part on top of the positioning stake-plate body combination and the thickness of the cross rib should be greater than that of the plate body of the positioning stake-plate body combination.

The structure of the assembly which applies to the deep water area is described as follows: the stake-plate body combination in two box boards is positioned in pairs and facing each other, the said bind member is a positioning baffle comprised of a plate body and an outward lug protruded outwardly along the direction of its outer surface on the upper edge of the plate body; and a groove is provided on the lower surface of the positioning plate body at the two ends of the positioning beam for coupling with the upper part of the middle stake of the stake-plate body combination, the length of the main girder of the positioning beam should be consistent with the distance between the outer edges of the plate bodies of the two opposite positioning stake-plate body combinations. In the above structure, the cross rib on the positioning baffle is composed of at least one cross rib connecting the two vertical ribs at the middle part of the positioning baffle.

A wall can be built on the top of the assembly for both structures stated above. The wall is formed by connecting the plate body-plate body combinations which is composed of two plate bodies posed at an angle and a connecting plate body between the two plate bodies, a space for the cast-in-place concrete is defined by the upper and the lower end surfaces and the plate body of the plate body-plate body combination. Also, reinforcing bar through holes are preferably formed on the connecting plate body, in which the reinforcing bars connecting the plate body-plate body combination pass through to have the plate body-plate body combination positioned. The plate body-plate body combination can be of the following shapes: the upper and the lower end surfaces of the connecting plate body is perpendicular to one of the plate bodies. The connecting plate body is integrally formed with one of the plate body as a single unit, a corresponding mounting hole is formed on the other plate body, pre-buried reinforcing bars are placed inside the hole, and protruded pre-buried reinforcing bars are provided on the end surface on which the connecting plate body is connected with the plate body.

Additionally, a breakwater is provided above the plate body-plate body combination as required.

The installation method of the assembly for this invention when used in shallow water areas is as follows:

a. locate the insert plate positioning frame on water bottom along a designed direction;
b. put two rows of stake-plate body combinations to a predetermined depth according to the position mark of the insert plate positioning frame above water surface and set them in place;
c. hang the insert plate positioning frame away;
d. for each row of stake-plate body combinations, put positioning stake-plate body combination into the preserved gaps between every two adjacent stake-plate body combinations and make the outward protruded positioning part locked by the stake-plate body combination and positioned by a cross rib; and
e. locate the lugless positioning beam in the open groove of the positioning stake-plate body combination.

The installation method of the assembly for this invention when used at deep water areas is as follows:

a. locate the insert plate positioning frame on water bottom along a designed direction;
b. put two rows of stake-plate body combinations to a predetermined depth according to the position mark of the insert plate positioning frame above water surface and set them in place;
c. hang the insert plate positioning frame away;
d. make positioning beam with forked ear buckled on two stake-plate body combinations to make the opening of the positioning beam baffle and the stake of the stake-plate body combinations being locked by each other; and
e. for each row of stake-plate body combinations, put the positioning baffle with rib in the space between two adjacent stake-plate body combinations to make the upper outwardly protruded lug to be located on top of the stake-plate body combination.

For the above two cases, in case the foundation is too soft, when inserting the stake-plate body combination or the positioning stake-plate body combination, the stake is put into foundation to a predetermined depth first and filled with grit or crushed stone through the stake holes, then the stake is lifted up to make the filling material spread into the space under the tip of the stake and then put it back in.

The construction of the sea entry road is proceeded as follows:

a. put the assembly into water;
b. make the assembly full of rubble;
c. add rubble to the designed height;
d. place mould plate above the two rows of structural members of the assembly; and
e. cast-in-place concrete between the mould plates to the designed height.

The construction of the artificial island is proceeded as follows:

a. put the assembly into water and form an annular frame;
b. make the assembly full of rubble;
c. install the plate body-plate body combination on top of the assembly;
d. put the main reinforcing bar through the reinforcing bar through hole in the plate body-plate body combination and tie up the main reinforcing bars with hoops;
e. cast concrete in-place in the plate body-plate body combination and preserve space for the breakwater;
f. install the breakwater at the preserved space; and
g. fill the inside of the annular wall formed by the plate body-plate body combinations and the breakwater with dry soil until reaching the height of the wall.

The construction of the seawall is proceeded as follows:

a. put the assembly into water along the designed direction;
b. make the assembly full of rubble;
c. install the plate body-plate body combination on top of the assembly;
d. put the main reinforcing bar through the reinforcing bar through hole on the plate body-plate body combination and tie up the main reinforcing bars with hoops;
e. cast concrete in-place in the plate body-plate body combination and preserve space for the breakwater;
f. install the breakwater at preserved space; and
g. fill the inside of the downstream face of the wall formed by the plate body-plate body combination and the breakwater with dry soil until reaching the height of the wall.

Wherein, the reference numerals refer to:

1—positioning stake-plate body combination
2—stake-plate body combination
3—positioning beam
4— and 5—cross ribs
6—breakwater
7—plate body-plate body combination 8—connecting plate body
9—reinforcing bar through hole
10—reinforcing bar
11—stake-plate body combination
12—positioning baffle
13—positioning beam
14—outward lug
15—cross rib
16—vertical rib

DETAILED DESCRIPTION OF THE PREFERRED EMBODIMENTS

Embodiment 1

In this embodiment, an assembly was used in shallow water area. The assembly includes two box boards and a positioning beam 3 above the two box boards, wherein the box boards were composed of two rows of stake-plate body combination 2 and the positioning stake-plate body combination 1 which were disposed facing each other respectively Cross ribs 4 and 5 were provided at the outer surface of the plate body of each of the stake-plate body combination 2 and the positioning stake-plate body combination 1. Both the upper and the middle parts of the outer surface of the stake-plate body combination 2 had cross rib 4. There were protruded parts, e.g., bind members, on two sides of the plate bodies above the cross rib of the positioning stake-plate body combination 1.

The stake-plate body combination 2 and the positioning stake-plate body combination 1 of each row of the box board were installed alternately. The distance between the two adjacent stake-plate body combinations 2 was consistent with the width of the plate body of the positioning stake-plate body combination 1. The positioning stake-plate body combination 1 was located at the outside of the stake-plate body combination 2 during installation and the protruded parts at the two sides above the positioning stake-plate body combination 1 were located above the middle cross rib of the stake-plate body combination 2. In this embodiment there was a positioning beam mounting groove on the middle part of the upper end surface of the plate body of the positioning stake-plate body combination 1. The length of the main girder of the positioning beam was consistent with the distance between the outer surface of the plate bodies of the two opposite positioning stake-plate body combinations (1) of the two rows of box boards. The positioning beam 3 was embedded in the groove on the upper end surface. The positioning plate bodies at two sides of the positioning beam 3 were located at the outside of the positioning stake-plate body combination 1.

Figure 1:
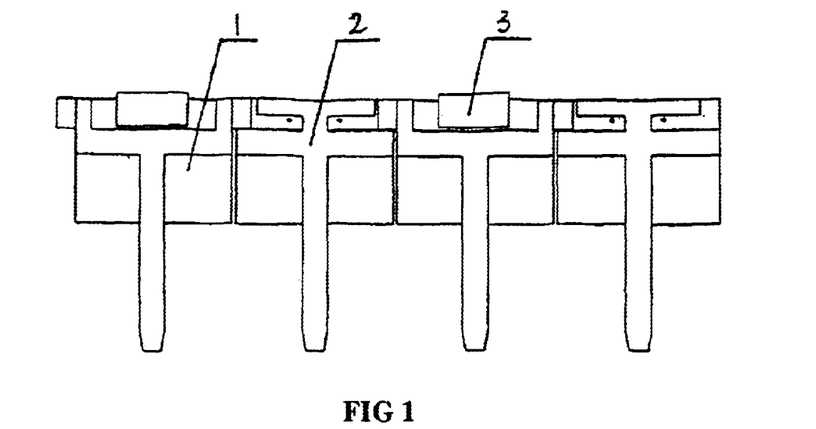
FIG. 1 is a front view of an underwater building unit assembly according to a first embodiment of the present invention.
Figure 2:
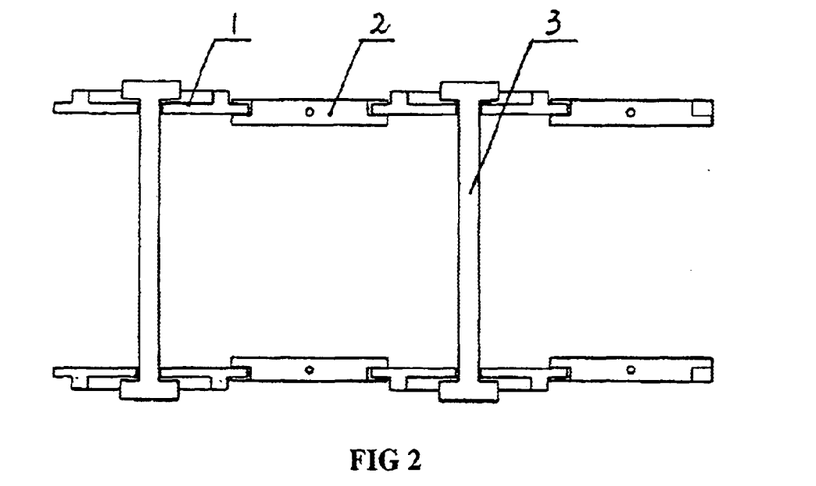
FIG. 2 is a vertical view of FIG. 1.
Figure 3:
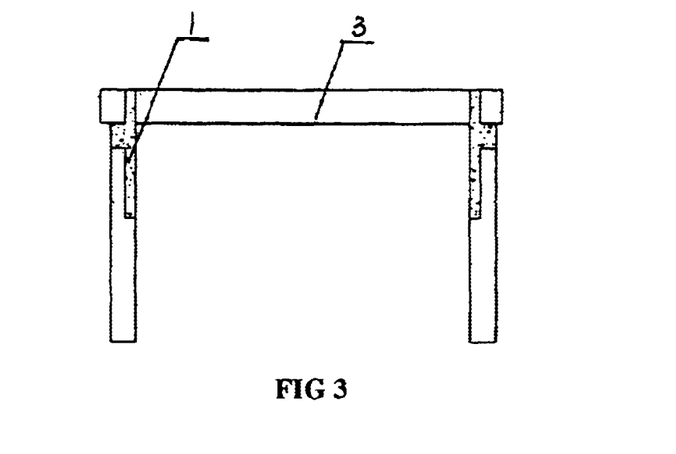
FIG. 3 is a left view of FIG. 1.
Figure 4:
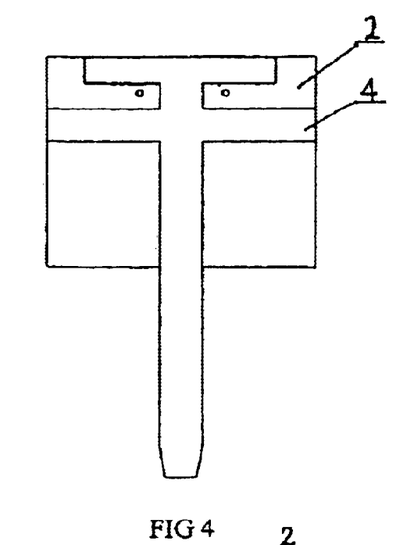
FIG. 4 is a front view of the stake-plate body combination of FIGS. 1–3.
Figure 5:
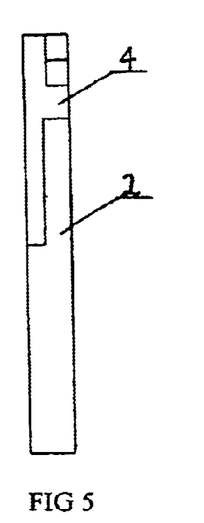
FIG. 5 is a left view of FIG. 4.
Figure 6:
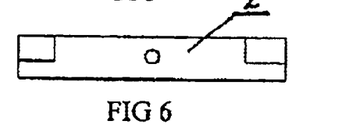
FIG. 6 is a vertical view of FIG. 4.
Figures 7, 8, 9:
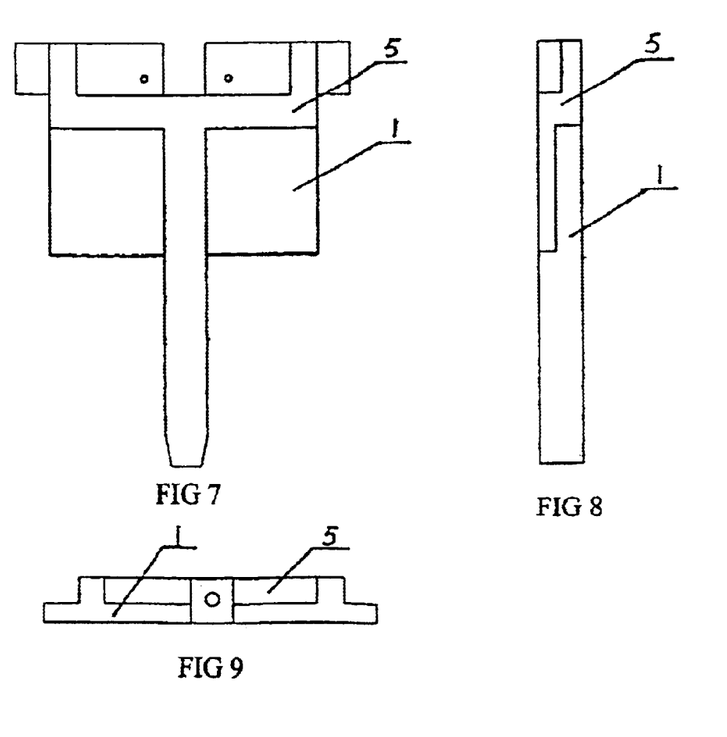
FIG. 7 is a front view of the positioning stake-plate body combination of FIG. 1.
FIG. 8 is a left view of FIG. 7.
FIG. 9 is a vertical view of FIG. 7.

During construction, the insert plate positioning frame was placed on water bottom along a designed direction first and the two rows of stake-plate body combination 2 was put to a predetermined depth according to the position mark of the insert plate positioning frame above water surface with gravity vibration or the press of the scoop of the excavator or water flushing to set them in place. In case the foundation was too soft and the stake could not stand up, the stake hole should be filled with grit or crushed stone and local disposal was conducted for the foundation of the stake tip, then the insert plate positioning frame was hanged away. For each row of the stake-plate body combination 2, the positioning stake-plate body combination 1 was put into the preserved gaps between every two adjacent stake-plate body combinations 2 and its outwardly protruded positioning part was locked by the stake-plate body combination 2 and positioned by a cross rib 4. The lugless positioning beam 3 was located in the open groove of the positioning stake-plate body combination 1.

Figure 10:
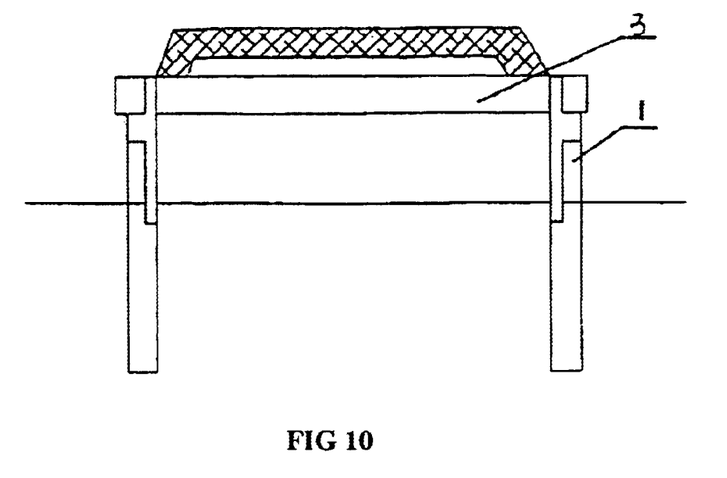
FIG. 10 is a sectional view of the sea entry road in the shallow water area.

The construction of the sea entry road with the assembly was proceeded as follows:
  a. put the assembly into water;
  b. make the assembly full of rubble;
  c. add rubble to the designed height;
  d. place the mould plate above the two rows of structural members of the assembly; and
  e. cast concrete in-place between the mould plates to the designed height.

Embodiment 2

Figure 11:
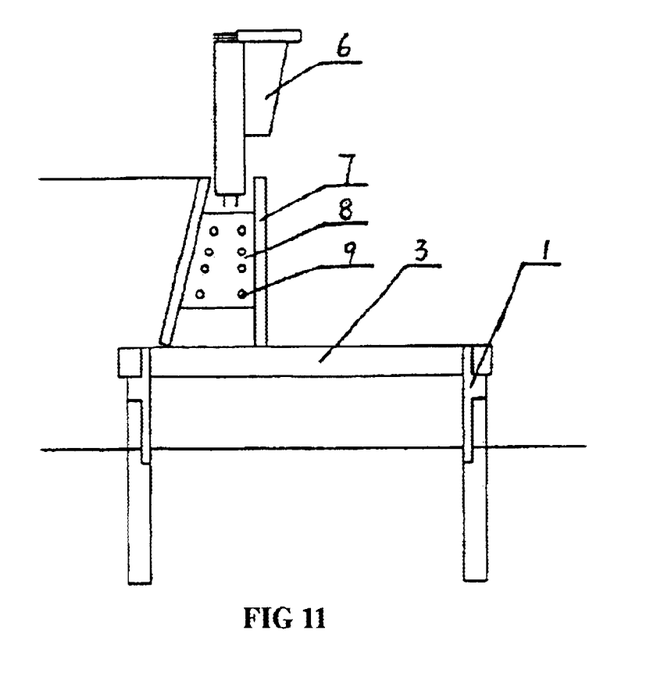
FIG. 11 is a sectional view of an underwater building unit assembly according to a second embodiment of the present invention.
Figure 12:
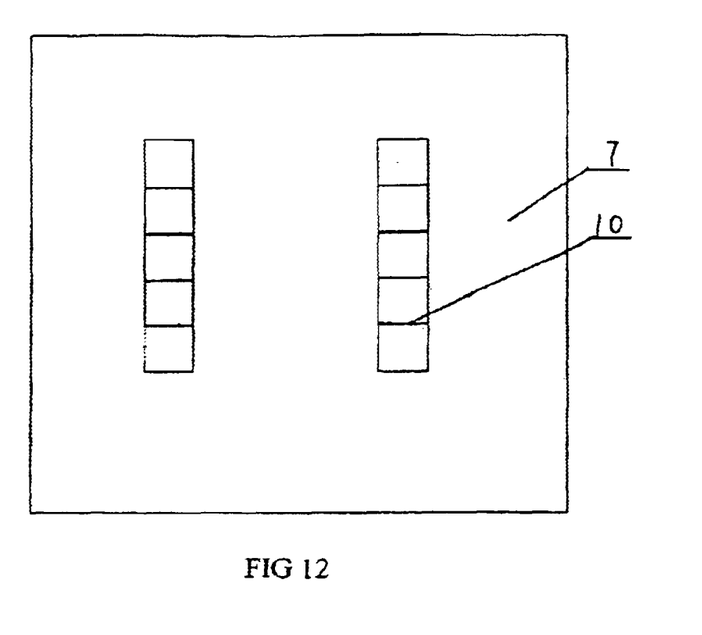
FIG. 12 is a front view of the plate body-plate body combination.
Figure 13:
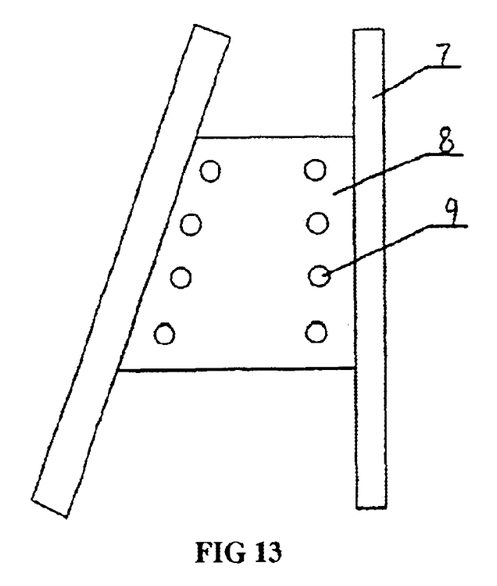
FIG. 13 is a right view of the plate body-plate body combination.

This embodiment included an assembly used in shallow water area, and the plate body-plate body combination 7 and the breakwater 6 provided on the assembly. The structure of the assembly used in shallow water area was the same as that in Embodiment 1 and will not be restated here. The plate body-plate body combination 7 in this embodiment was composed of two plate bodies posed at an angle and a connecting plate body 8 between the two plate bodies. The connecting plate body 8 was perpendicular to one of the plate bodies and was integrally formed with the said plate body as a single unit. A corresponding mounting hole was formed on the other plate body, pre-buried reinforcing bars were placed inside the hole, and protruded pre-buried reinforcing bars were provided on the end surface on which connecting plate body was connected with the plate body. The outside end of the connecting plate body 8 was embedded in the mounting hole. Reinforcing bar through holes 9 were formed on the connecting plate body 8 to allow the reinforcing bars connecting the plate body-plate body combination to past through. A space for the cast-in-place concrete was defined by the upper and the lower end surfaces of the plate body-plate body combination and the plate body. The breakwater is available in the prior art.

During installation, a row of plate body-plate body combination 7 was placed above the assembly first and the reinforcing bars were inserted through the reinforcing bar through hole 9 on the connecting plate body 8. Then concrete was cast into the plate body-plate body combination 7 and the breakwater 6 was installed above the plate body-plate body combination 7.

When building artificial island with this kind of assembly, the procedure was as follows:
  a. put the assembly into water and form an annular frame;
  b. make the assembly full of rubble;
  c. install the plate body-plate body combination above assembly;
  d. pass the main reinforcing bar through the reinforcing bar through hole in plate body-plate body combination and tie up the main reinforcing bar with hoops;
  e. cast concrete in-place within the plate body-plate body combination and preserve a space for the breakwater;
  f. install the breakwater at the preserved space; and
  g. fill the inside of the annular wall shaped by plate body-plate body combination and breakwater with dry soil until reaching the height of wall.

When building seawall with this kind of assembly, the procedure was as follows:
  a. put the assembly into water;
  b. make the assembly full of rubble;

c. install the plate body-plate body combination on the top of the assembly;

d. put the main reinforcing bar through the reinforcing bar through hole on the plate body-plate body combination and tie up the main reinforcing bar with hoops;

e. cast concrete in-place in the plate body-plate body combination and preserve space for the breakwater;

f. install the breakwater at the preserved space; and g. fill the inside of the annular wall body formed by the plate body-plate body combination and the breakwater with dry soil until reaching the height of the wall body.

Embodiment 3

In this embodiment, an assembly was used in deep water area. It consisted of two box boards which were composed of two rows of stake-plate body combination 11 and the positioning stake-plate body combination 12 disposed facing each other respectively, and the positioning beam 13 above the two box boards. The stake-plate body combination 11 in this embodiment consisted of the plate bodies and the stakes, the positioning baffle 12 (e.g., bind member) was comprised of a plate body and an outward lug protruded outwardly along the direction of its outer surface on the upper edge of the plate body. There are two vertical ribs 16 in the middle of the outer surface of the plate body, two cross ribs 15 was provided between the two vertical ribs 16 to connect the two vertical ribs 16. The stake-plate body combination 11 and the positioning baffle 12 in each row of the box boards are installed alternately. The positioning baffle 12 was located between two adjacent stake-plate body combinations 11. Both sides of the positioning baffle 12 overlapped on the inside surface of the stake-plate body combination 11. The outward lug 14 on the upper end was located above the stake-plate body combination 11. In this embodiment both ends of the main girder of the positioning beam 13 were formed with positioning plate bodies with an open groove at its lower end surface. The length of the main girder of the positioning beam was consistent with the distance between the two opposite positioning stake-plate body combinations 11 of the two rows of box boards.

Figure 14:
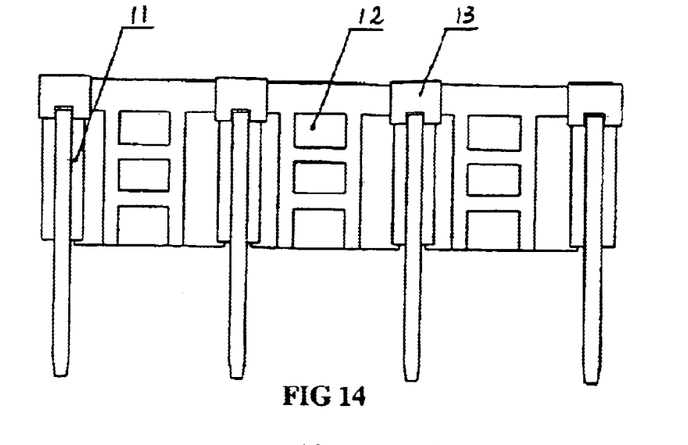
FIG. 14 is a front view of an underwater building unit assembly according to a third embodiment of the present invention.
Figure 15:
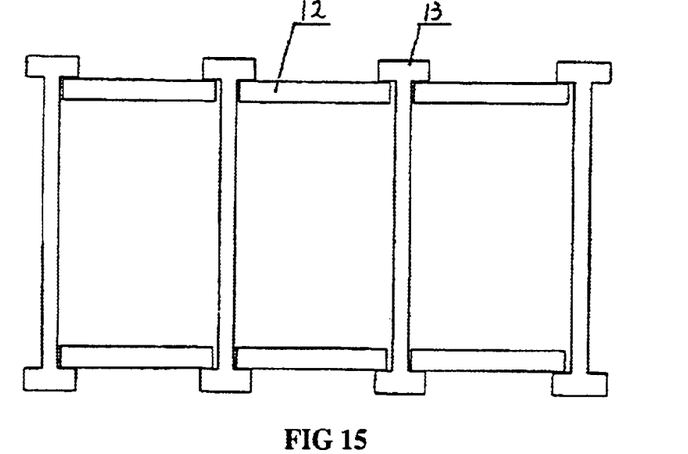
FIG. 15 is a vertical view of FIG. 14.
Figure 16:
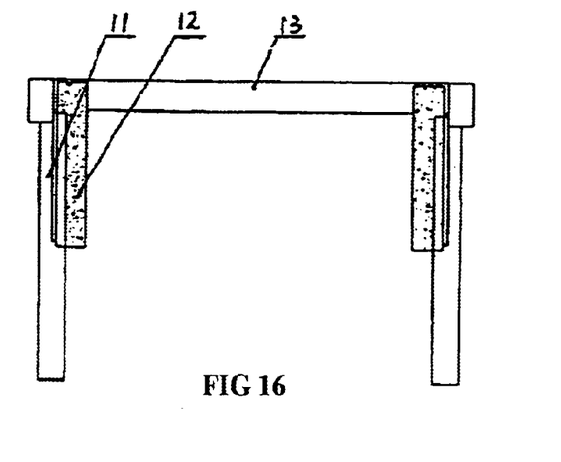
FIG. 16 is a left view of FIG. 14.
Figure 17:
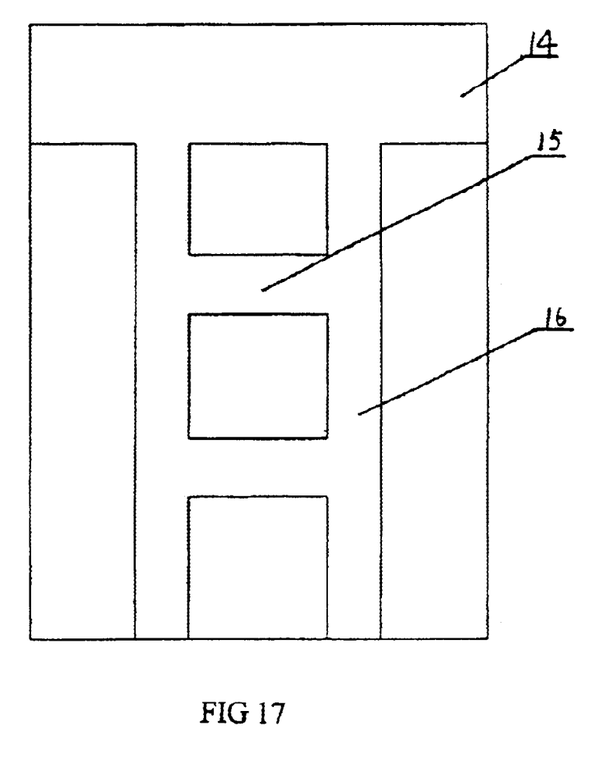
FIG. 17 is a front view of the positioning baffle.
Figure 18:
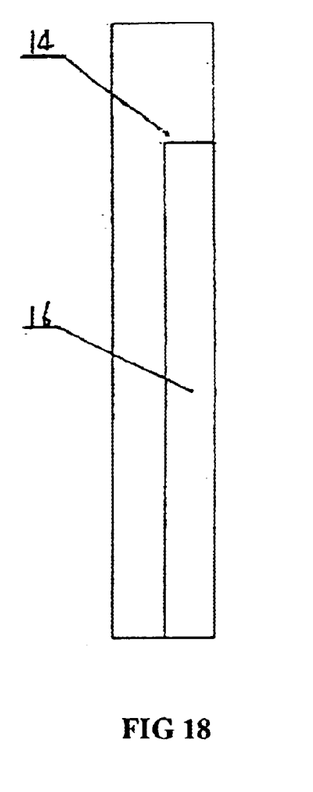
FIG. 18 is a left view of FIG. 17.
Figure 19:
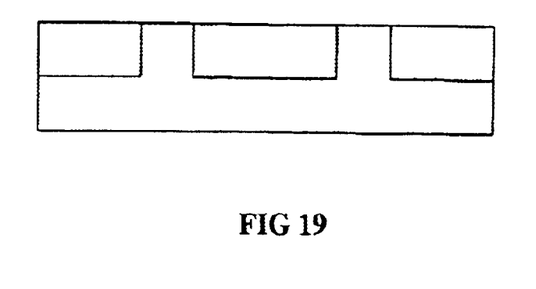
FIG. 19 is a upward view of FIG. 17.
Figure 20:
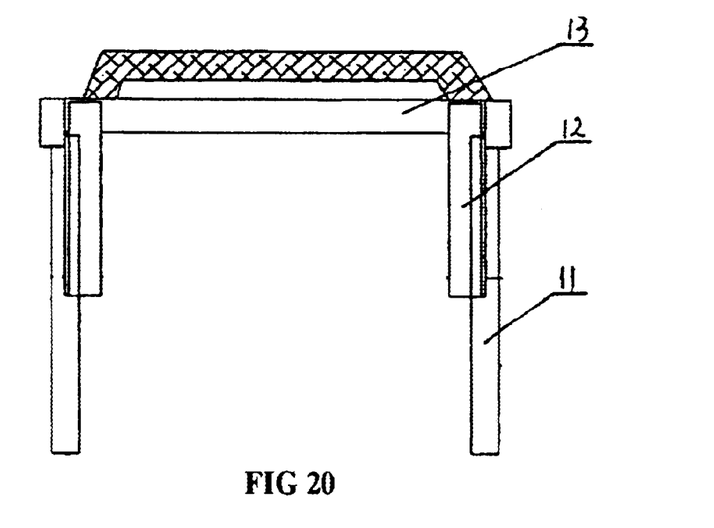
FIG. 20 is a sectional view of the sea entry road in deep water area.

The installation method of this assembly used in deep water area was as follows: locate the insert plate positioning frame on water bottom along a designed direction; put the two rows of stake-plate body combinations to a predetermined depth according to the position mark of the insert plate positioning frame above water surface to set them in place with the corresponding methods as used in shallow water area; hang the insert plate positioning frame away; allow the positioning beam 13 with forked ear buckled on two stake-plate body combinations 11 to make the opening of the baffle of the positioning beam 13 and the stake of the stake-plate body combination 11 being locked by each other; and for each row of stake-plate body combination 11, put the positioning baffle 12 with rib in the space between two adjacent stake-plate body combinations 11, let the outward lug 14 on the upper part sit on the top of the plate body of the stake-plate body combination 11.

When building sea entry road with this kind of assembly, the procedure is as follows:

a. put the assembly into water;

b. make the assembly full of rubble;

c. add rubble to the designed height;

d. place mould plate above the two rows of structural members of the assembly; and e. cast concrete in-place between the mould plates to the designed height.

Embodiment 4

Figure 21:
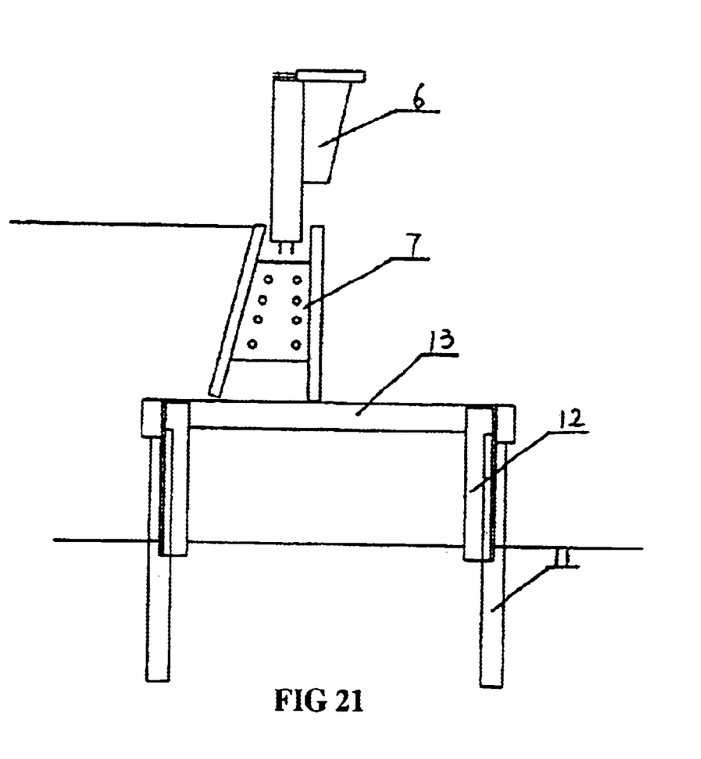
FIG. 21 is a sectional view of an underwater building unit assembly according to a fourth embodiment of the present invention.

This embodiment included the assembly for deep water area, the plate body-plate body combination 7 and the breakwater 6 on the plate body-plate body combination 7. The structure of the assembly is the same as that in Embodiment 3 and the structure of the plate body-plate body combination 7 and the breakwater 6 is the same as that in Embodiment 2, and they were installed on top of the assembly sequentially. This will not be repeated here.

The installation method of the assembly in this embodiment is the same as that in Embodiment 3. The installation method of the plate body-plate body combination 7 and the breakwater 6 is the same as that in Embodiment 2.

When building an artificial island with this assembly, the procedure is as follows:

a. put the assembly into water and form an annular frame;

b. make the assembly full of rubble;

c. install the plate body-plate body combination on the top of the assembly;

d. put the main reinforcing bar through the reinforcing bar through hole in the plate body-plate body combination and tie up the main reinforcing bars with hoops;

e. cast concrete in-place in the plate body-plate body combination and preserve a space for the breakwater;

f. install the breakwater at the preserved space; and g. fill the inside of the annular wall formed by the plate body-plate body combinations and the breakwater with dry soil until reaching the height of the wall.

When building a seawall with this kind of assembly, the procedure is as follows:

a. put the assembly into water along a designed direction;

b. make the assembly full of rubble;

c. install the plate body-plate body combination on the top of the assembly;

d. put the main reinforcing bar through the reinforcing bar through hole on the plate body-plate body combination and tie up the main reinforcing bars with hoops;

e. cast concrete in-place in the plate body-plate body combination and preserve a space for the breakwater;

f. install the breakwater at the preserved space; and g. fill the inside of the downstream face of the wall formed by the plate body-plate body combination and the breakwater with dry soil until reaching the height of the wall body.

What is claimed is:

1. An underwater building unit comprising:

an assembly including at least two rows of box boards not being intersected with each other and with both ends open;

each row of box boards having a set of stake-plate body combinations and a set of bind members between adjacent stake-plate body combinations;

a positioning beam located on the top of the box boards to connect two box boards; and a cross rib provided substantially along a middle section of an outer surface of each of the bind members.

2. The underwater building unit according to claim 1, wherein:

the bind members are positioning stake-plate body combinations that are located above the cross rib of the plate body and have outwardly protruded parts, and the stake-plate body combination and the positioning stake-plate body combination are mounted facing each other in the two rows of box boards respectively;

positioning beam mounting grooves are formed in the middle of the top edge of the plate body of the positioning stake-plate body combination, at least a part of a main girder of the positioning beam being embedded into the positioning beam mounting groove; and the length of the main girder of the positioning beam is designed to be consistent with the distance between the outer surface of the plate bodies of the two opposite positioning stake-plate body combinations of the two rows of box boards.

3. The underwater building unit according to claim 2, further comprising:

a cross rib provided on the outer surface of the stake-plate body combination, and located at a position being consistent with that of the cross rib on the plate body of the positioning stake-plate body combination, said cross rib being coupled with the outwardly protruded parts of the plate body of the positioning stake-plate body combination.

4. The underwater building unit according to claim 1, wherein:

the stake-plate body combinations are mounted in pairs and facing each other in the two rows of box boards, and each said bind member is a positioning baffle comprised of a plate body and an outward lug protruded outwardly in a direction of its outer surface on an upper edge of the plate body; and a groove is provided on a lower surface of a positioning plate body at two ends of a positioning beam to be coupled with an upper part of a middle stake of the stake-plate body combination, and a length of a main girder of the positioning beam is consistent with a distance between the outer surfaces of the plate bodies of opposed stake-plate body combinations.

5. The underwater building unit according to claim 4, further comprising a cross rib on the positioning baffle composed of at least one cross rib connecting two vertical ribs at a middle part of the positioning baffle.

6. The underwater building unit according to claim 1, wherein:

a wall formed with a plate body-plate body combination is provided on a top of the assembly;

the plate body-plate body combination includes at least two plate bodies posed at an angle and a connecting plate body between the two plate bodies; and a space for cast-in-place concrete is defined by upper and the lower end surfaces of the plate body-plate body combination and the plate body.

7. The underwater building unit according to claim 6, further comprising reinforcing bar through holes are formed on the connecting plate body.

8. The underwater building unit according to claim 7, wherein the upper and the lower end surfaces of the connecting plate body are perpendicular to one of the plate bodies.

9. The underwater building unit according to claim 8, wherein:

the connecting plate body is integrally formed as a single unit with one of the plate bodies;

a corresponding mounting hole is formed on the other plate body;

pre-buried reinforcing bars are placed inside the hole; and protruded pre-buried reinforcing bars are provided on the end surface on which the connecting plate body is connected with the plate body.

10. The underwater building unit according to claim 6, further comprising a breakwater provided above the plate body-plate body combination.

11. An installation method of the underwater building unit according to claim 1, comprising:

a. locating an insert plate positioning frame on a water bottom along a designed direction;

b. placing the two rows of said stake-plate body combinations to a predetermined depth according to the position mark of the insert plate positioning frame above water surface and setting them in place;

c. hanging the insert plate positioning frame away;

d. for each row of said stake-plate body combinations, placing a positioning stake-plate body combination into the preserved gaps between every two adjacent stake-plate body combinations and making an outwardly protruded positioning part locked by the stake-plate body combination and positioned by a cross rib; and e. locating the positioning beam in the open groove of the positioning stake-plate body combination.

12. An installation method of the underwater building unit according to claim 1, comprising:

a. locating an insert plate positioning frame on a water bottom along a designed direction;

b. placing two rows of said stake-plate body combination to a predetermined depth according to the position mark of the insert plate positioning frame above water surface and setting them in place;

c. hanging the insert plate positioning frame away;

d. allowing a positioning beam with a forked ear to buckle on two stake-plate body combinations to make an opening of a positioning beam baffle, the stake of the stake-plate body combinations being locked by each other; and e. for each row of stake-plate body combinations, placing the baffle with rib in the space between two adjacent stake-plate body combinations.

13. The installation method of the underwater building unit according to claim 11, wherein, in case the foundation is too soft, when inserting the stake-plate body combination or the positioning stake-plate body combination, positioning the stake into the foundation to a predetermined depth first and filling with grit or crushed stone through the stake hole, lifting the stake to allow the filling material to spread into the space under the tip of the stake, and placing the stake back in.

14. An application method of the underwater building unit according to claim 1, wherein construction of a sea entry comprises:

a. positioning the assembly into water;

b. substantially filling the assembly with rubble;

c. adding rubble to a designed height;

d. placing a mould plate above the two rows of the assembly; and e. casting concrete in-place between mould plates to the designed height.

15. An application method of the underwater building unit according to claim 1, wherein construction of an artificial island comprises:

a. putting the assembly into water and forming an annular frame;

b. substantially filling the assembly with rubble;

c. installing a plate body-plate body combination on top of the assembly;

d. putting a main reinforcing bar through a reinforcing bar through hole in the plate body-plate body combination and tying up the main reinforcing bars with hoops;

e. casting concrete in-place in the plate body-plate body combination to preserve space for a breakwater;

f. installing the breakwater at the preserved space; and g. filling the inside of the annular wall formed by the plate body-plate body combinations and the breakwater with dry soil until reaching the height of the wall.

16. An application method of the underwater building unit according to claim 1, wherein the construction of a seawall comprises:

a. putting the assembly into water along a designed direction;

b. substantially filling the assembly with rubble;

c. installing a plate body-plate body combination on the top of the assembly;

d. putting a main reinforcing bar through a reinforcing bar through hole on the plate body-plate body combination and tying up the main reinforcing bars with hoops;

e. casting concrete in-place in the plate body-plate body combination and to preserve a space for a breakwater;

f. installing the breakwater at the preserved space; and g. filling an inside of a downstream face of the wall formed by the plate body-plate body combination and the breakwater with dry soil until reaching the height of the wall body.

* * * * *